(12) United States Patent
Robinson et al.

(10) Patent No.: US 7,532,357 B2
(45) Date of Patent: *May 12, 2009

(54) JOB SUBMISSION SYSTEM AND METHOD FOR CONTROLLING MULTIPLE JOB RENDERINGS WITH A SINGLE MASTER OR "SUPER" TICKET

(75) Inventors: David C. Robinson, Penfield, NY (US); Randall R. Hube, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 737 days.

This patent is subject to a terminal disclaimer.

(21) Appl. No.: 10/014,637

(22) Filed: Oct. 26, 2001

(65) Prior Publication Data

US 2002/0080402 A1   Jun. 27, 2002

Related U.S. Application Data

(60) Provisional application No. 60/257,903, filed on Dec. 26, 2000.

(51) Int. Cl.
G06F 3/12 (2006.01)
G06K 15/00 (2006.01)

(52) U.S. Cl. ............... 358/1.9; 358/1.15; 358/1.12; 358/1.13

(58) Field of Classification Search ............ 358/1.15, 358/1.12, 1.16, 1.18, 1.9, 1.13, 296, 1.1; 709/201; 718/101, 102, 104, 105, 106
See application file for complete search history.

(56) References Cited

U.S. PATENT DOCUMENTS

| | | | |
|---|---|---|---|
| 5,243,381 A | 9/1993 | Hube | 355/204 |
| 5,513,126 A | 4/1996 | Harkins et al. | 364/514 A |
| 5,600,762 A * | 2/1997 | Salgado et al. | 358/1.15 |
| 5,718,520 A | 2/1998 | MacKay | 400/61 |
| 5,872,569 A | 2/1999 | Salgado et al. | 345/349 |

(Continued)

FOREIGN PATENT DOCUMENTS

| EP | 001220085 | * | 7/2008 |
|---|---|---|---|
| EP | 000672605 | * | 9/2008 |
| JP | 2002278721 | * | 9/2002 |

OTHER PUBLICATIONS

Interpress The Source Book, Steven Harrington, Robert R. Buckley, pp. 334-337 and 432 & 433.

*Primary Examiner*—Jerome Grant, II
(74) *Attorney, Agent, or Firm*—Fay Sharpe LLP

(57) ABSTRACT

There is provided a job control system for a document processing system having a document processing subsystem in which a job, including a set of image data and a job control ticket, is processed each time the job, along with the job control ticket, is submitted to the document processing system. The job control system includes an input source including a user interface with a display, the user interface being used to (a) program a first job control ticket with a first set of attributes, the first job control ticket controlling a manner in which the job is to be processed in a first job processing event, and (b) program a second job control ticket with a second set of attributes, the second job control ticket controlling a manner in which the job is to be processed in a second job processing event; and a linking program for causing the first and second job control tickets to be linked to the set of image data so that a single submission of the job causes the job to be processed in the first job processing event with the first job control ticket and in the second job processing event with the second job control ticket, wherein the job need not be submitted to the document processing subsystem multiple times.

21 Claims, 8 Drawing Sheets

U.S. PATENT DOCUMENTS

| | | | |
|---|---|---|---|
| 6,052,198 A * | 4/2000 | Neuhard et al. | 358/1.15 |
| 6,126,163 A * | 10/2000 | Katsuta et al. | 271/223 |
| 6,243,172 B1 * | 6/2001 | Gauthier et al. | 358/1.18 |
| 6,393,231 B2 * | 5/2002 | Okawa et al. | 399/81 |
| 6,509,974 B1 * | 1/2003 | Hansen | 358/1.12 |
| 6,606,163 B1 * | 8/2003 | Suzuki et al. | 358/1.15 |
| 6,697,898 B1 * | 2/2004 | Shishizuka et al. | 710/107 |
| 6,727,999 B1 * | 4/2004 | Takahashi | 358/1.15 |
| 6,825,943 B1 * | 11/2004 | Barry et al. | 358/1.15 |
| 7,405,836 B2 * | 7/2008 | Hube et al. | 358/1.15 |
| 2003/0103237 A1 * | 6/2003 | Han | 358/1.18 |
| 2007/0133032 A1 * | 6/2007 | Robinson | 358/1.14 |

* cited by examiner

JOB SUBMISSION SYSTEM AND METHOD FOR CONTROLLING MULTIPLE JOB RENDERINGS WITH A SINGLE MASTER OR "SUPER" TICKET

This application is based on a provisional application No. 60/257,903, filed Dec. 26, 2000.

CROSS-REFERENCE TO RELATED U.S. PATENT APPLICATION

The present application is related in subject matter to and cross-referenced with U.S. patent application Ser. No. 10/014,637 (entitled "JOB SUBMISSION SYSTEM AND METHOD FOR CONTROLLING MULTIPLE JOB RENDERINGS WITH A SINGLE MASTER OR 'SUPER" TICKET'"), the cross-reference application being filed by Robinson et al. on the same day as the present Application. The disclosure of the above-mentioned application is incorporated herein by reference.

FIELD OF THE INVENTION

The present invention relates to a job control system (and method therefor) in which multiple job "tickets" created for a single document are selectively activated with, for instance, a master or "super" ticket to produce various physical forms or renderings of the document in a single submission session.

BACKGROUND OF THE INVENTION

Electronic printing systems include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox known as the DocuTech electronic publishing system ("DocuTech" is a registered trademark of Xerox Corporation), a job can be inputted to the IIT from, among other sources, a network or a scanner. An example of an IIT with both network and scanner inputs is found in U.S. Pat. No. 5,170,340 to Prokop et al. (Issued: Dec. 8, 1992).

When a scanner is employed to generate the job (in the context of, for example, a digital copier), image-bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device.

Electronic printing systems, sometimes also called "electronic reprographic systems", are advantageous in that they can be coupled with other components, by way of a network, to facilitate image processing operations among the components. An example of a network printing arrangement including a wide range of image processing capability can be found in U.S. Pat. No. 5,113,494 to Menendez et al. (Issued: May 12, 1992).

As borne out by U.S. Pat. No. 5,113,494, a significant amount of control for a network printing system resides in one or more network servers. The following patents disclose examples of systems including servers: U.S. Pat. No. 5,220,674 to Morgan et al. (Issued: Jun. 15, 1993) and U.S. Pat. No. 5,243,518 to Holt et al. (Issued: Sep. 7, 1993). Brief discussions of U.S. Patent Nos. 5,113,494; 5,220,674; and 5,243,518 are provided in U.S. Pat. No. 5,872,569 to Salgado et al. (Issued: Feb. 16, 1999). U.S. Pat. No. 5,243,518 is particularly noteworthy to the area of electronic printing in that it discloses a layered document services architecture facilitating operation and interconnection of electronic printing systems with both resident and non-resident work inputs.

Programming a job is often achieved with a "job ticket". For many printing systems, the job ticket is provided in the form of one or more programmable dialogs, each programmable dialog including values which are selected with a user interface, such as the user interface found in a DocuTech ("DocuTech" is a registered trademark of Xerox Corporation) printing system. Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values, e.g., stock size.

Disclosures of relatively complex job ticketing approaches are provided by way of the following patents:

U.S. Pat. No. 5,079,723 to Herceg et al. (Issued: Jan. 7, 1992)
U.S. Pat. No. 5,260,805 to Barrett (Issued: Nov. 9, 1993)
U.S. Pat. No. 5,398,289 to Rourke et al. (Issued: Mar. 14, 1995)
U.S. Pat. No. 5,450,571 to Rosekrans et al (Issued: Sep. 12, 1995)
U.S. Pat. No. 5,600,762 to Salgado et al. (Issued: Feb. 4, 1997)

The patents listed above are discussed in U.S. Pat. No. 5,872,569 to Salgado et al. Other patents providing further background in the area of user interface design include:

U.S. Pat. No. 5,513,126 to Harkins et al. (Issued: Apr. 30, 1996)
U.S. Pat. No. 5,718,520 to Mackay (Issued: Feb. 17, 1998)
U.S. Pat. No. 5,872,569 to Salgado et al. is directed toward a system, with a screen display, and an application server, is provided. Preferably, the application server registers one of a plurality of metaphor elements with a set of device attributes. A status indicating metaphor or a control metaphor is developed for use with the one of the plurality of metaphor elements. When displaying a metaphorical template, including the one of the plurality of metaphors on the screen display, the status indicating or control metaphor is associated with the one of the plurality of metaphor elements for facilitating the programming of a job or controlling an output of the job.

U.S. Pat. No. 5,513,126 Harkins et al. is directed toward a method for a sender to automatically distribute information to a receiver on a network using devices (such as printers and facsimile machines) and communication channels (such as electronic mail) defined in a receiver profile. The receiver profile establishes the properties and mode for receipt of information for receivers on the network and the profile is published in a network repository for all network users or is accessible by selected groups or individuals on the network. Receivers have additional control over network senders by defining an information filter which further controls sender channel access (to a receiver) by defining some channels as having priority of access such as direct or delayed access, as well as selectively permitting senders to override the receiver profile. Consequently, receiver profiles provide a variable receiver definable link to senders using multiple forms of media as well as multiple hardware platforms and network configurations.

U.S. Pat. No. 5,718,520 to Mackay is directed toward an apparatus for automatically modifying a print job ticket having a plurality of page tickets is provided. Each page ticket is programmed with one or more print job attributes and each print job attribute is associated with one or more print job characteristics. In practice, one or more values are assigned respectively to the one or print job characteristics. The print job attributes and print job characteristics are stored in memory as a set, and a portion of the set is scanned with a processor to determine each page ticket upon which a print job characteristic first value is located. A set of page tickets is selected from the page ticket(s) determined with the processor and, for at least a portion of the set of page tickets, one or more print job characteristic first values are changed to print job characteristic second values so that the need on the part of a printing system user to manually change print job characteristic first values to print job characteristic second values is minimized.

As is known, job tickets can also be provided in hardcopy form. A discussion of "paper UI" is provided in U.S. Pat. No. 5,243,381 to Hube et al. (Issued: Sep. 7, 1993). In accordance with U.S. Pat. No. 5,243,381, a link to a job ticket is provided through a "separator sheet" upon which one or more bar codes are printed. In practice, when an image capture device, such as a scanner, reads the bar code, a corresponding pre-stored set of job programming instructions is retrieved from memory for use in processing a job.

In the context of print job production, it is understood that the following problem or publishing need can arise:

Users often need to print a single piece of information (a document) more than one way, essentially producing multiple different physical forms of a document. For example a lecturer, about to give a presentation, may desire to print his or her presentation in the following ways (or job types):

50 stapled, duplex sets w/covers to use as handouts 1 simplex set of overhead transparencies for the actual presentation 1 simplex set of punched paper (for the presenter to keep notes on)

It is understood that, in a significant number of currently available digital printers/copiers, this presentation would be processed by submitting a single file, expressed in a conventional page description language ("PDL") multiple times to a printer, where a different "job ticket" is provided for each way. The presentation is to be printed or rendered. To the printer, these jobs appear to be distinct jobs and are processed totally independent of each other. Obviously, submitting PDL across a network to the Print Server multiple times is inefficient.

A few products, such as DocuTech with its DocuSP controller ("DocuTech" and "DocuSP" are trademarks of Xerox Corporation), solve the problem of multiple PDL submissions by allowing a user to SAVE a job, with its associated first job ticket, on a print server. The job data is then referenced by a pointer in subsequent job submissions containing just new job tickets. That is, each new job ticket is referenced (one-at-a-time) to a print ready file. Job Tickets can also be saved and later retrieved for application to a particular job.

While saving jobs and tickets, in the manner described above, goes a long way toward addressing the perceived problem (i.e. the problem of printing a presentation of multiple job types in multiple submissions), one further problem remains: How can all job tickets applicable to a job be logically related to the job, and the resulting relationship be maintained over time?

By way of the above-mentioned U.S. Pat. No. 5,600,762 to Salgado et al., it is known that a print job, may be a "composite job" where, the composite job is really nothing more than the packaging of multiple individual job segments into a singular entity that is printed together in some determined quantity. In this case, each job segment consists of its own page images (usually in PDL form) and an associated "segment" ticket. These segments are concatenated together and processed by the printer to produce a collection of documents that are somehow related.

The approach of U.S. Pat. No. 5,600,762 to Salgado et al. may be used to print what are known as "course packs". An example of a course pack might include a job where the first segment of the job is an instruction sheet on green paper to be read by the student, the second segment is a set of readings the student is directed to read, and the third segment is a test to be taken after the student has read the material. Usually, for these composite jobs, some job ticket parameters, such as print quantity, are best applied globally and must be placed in a global ticket, whereas other job ticket parameters, such as media, are best applied within the individual segment tickets.

This approach, however, is believed to fall short of addressing the publishing need identified above. To produce the multiple forms of the presentation in the example posed immediately above, the page images would, at least in some instances, have to be repeated in each of the segments—that could be wasteful—and the global programming could cause some problems (e.g. produce the same quantity of overheads as handouts).

"Interpress", a Xerox developed PDL, addressed the above-identified publishing need through use of a programming instruction known as "IFCOPY". IFCOPY is intended to allow certain copies within a multi-copy job to be rendered with alternate programming (e.g. copies 1-3 on white paper and copy 4 on blue paper). However, there appear to be several problems with using this approach in the context of print job programming:

First, the IFCOPY instruction is coded deep within an Interpress master (possibly at multiple page locations) and cannot be easily changed once the PDL file (with its corresponding programming) is created. To use the IFCOPY functionality in a manner similar to a job ticket, a user would be required to parse the PDL file, locate relevant programming or instruction(s), replace it with an alternate instruction(s), and rebuild the master. This is hardly the type of programming that would be suitable for use in a typical printing arrangement.

Second, its effective use would also require that the PDL language itself be capable of specifying all the printing instructions necessary to produce a job. However, because many complex job ticket instructions are often device dependent and not associated directly with image rendering, they are often not considered appropriate instructions for inclusion in the PDL, and thus do not exist in the PDL.

In view of the above, it would be desirable to provide a system (with suitable attendant process) in which multiple job tickets can be programmed for a single submission to a printer, along with one corresponding set of image data, to yield multiple job renderings. Moreover, it would be desirable to provide a convenient vehicle for storing the tickets together with the image data so that the programming for the multiple job renderings can be readily manipulated or edited.

All of the disclosures for the patents referenced in the above Background are incorporated herein by reference.

SUMMARY OF EMBODIMENTS OF THE INVENTION

In one aspect of the disclosed invention, there is provided a job control system for a document processing system having a document processing subsystem in which a job, including a set of image data and a job control ticket, is processed each time the job, along with the job control ticket, is submitted to the document processing system. The job control system includes: an input source including a user interface with a display, the user interface being used to (a) program a first job control ticket with a first set of attributes, the first job control ticket controlling a manner in which the job is to be processed in a first job processing event, and (b) program a second job control ticket with a second set of attributes, the second job control ticket controlling a manner in which the job is to be processed in a second job processing event; and a linking program, said linking program causing the first and second job control tickets to be linked to the set of image data so that a single submission of the job causes the job to be processed in the first job processing event with the first job control ticket and in the second job processing event with the second job control ticket, wherein the job need not be submitted to the document processing subsystem multiple times.

Alternatively, the linking program of the above embodiment could link the first and second job control tickets with a master job control ticket instead of with the image data set so that a single submission of the image data set with the master job control ticket causes the job to be processed in one or both of the first job processing event with the first job control ticket and the second job processing event with the second job control ticket, wherein the job need not be submitted to the document processing subsystem multiple times.

In yet another aspect of the disclosed invention there is provided another job control system for a document processing system having a document processing subsystem in which a job, including a set of image data and a job control ticket, is processed each time the job, along with the job control ticket, is submitted to the document processing system. This other job control system includes: a memory; one or more job control tickets in said memory, the one or more job control tickets including a selected job control ticket with a set of programmed attributes; a master job control ticket for controlling a manner in which the job is processed, the master job ticket including one or more user selectable portions, the one or more user selectable portions being corresponded respectively with the one or more job control tickets; wherein a first one of the one or more user selectable portions is corresponded with the selected job control ticket so that when the first one of the one or more user selectable portions is selected and the job is submitted to the document processing subsystem along with the master job control ticket, the job is processed in accordance with the set of programmed attributes of the selected job ticket.

In another aspect of the disclosed invention there is provided yet another job control system for a document processing system having a document processing subsystem in which a job, including a set of image data and a job control ticket, is processed each time the job, along with the job control ticket, is submitted to the document processing system. This other job control system includes: a memory; a first job control ticket with a first set of attributes, the first job control ticket controlling a manner in which the job is to be processed in the first job processing event; a second job control ticket with a second set of attributes, the second job control ticket controlling a manner in which the job is to be processed in the second job processing event; and a data structure including the set of image data, the first job control ticket and the second job control ticket, wherein the set of image data is linked to both the first and second job control tickets so that a single submission of the set of image data causes the job to be processed in the first job processing event with the first job control ticket and in the second job processing event with the second job control ticket, wherein the job need not be submitted to the document processing subsystem multiple times.

Alternatively, the data structure of the above-disclosed embodiment could comprise the first and second job control tickets both linked to a master job control ticket so that a single submission of the set of image data with the master job control ticket causes the job to be processed in the first job processing event with the first job control ticket and in the second job processing event with the second job control ticket, wherein the job need not be submitted to the document processing subsystem multiple times.

DETAILED DESCRIPTION OF EMBODIMENT(S) THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 5:
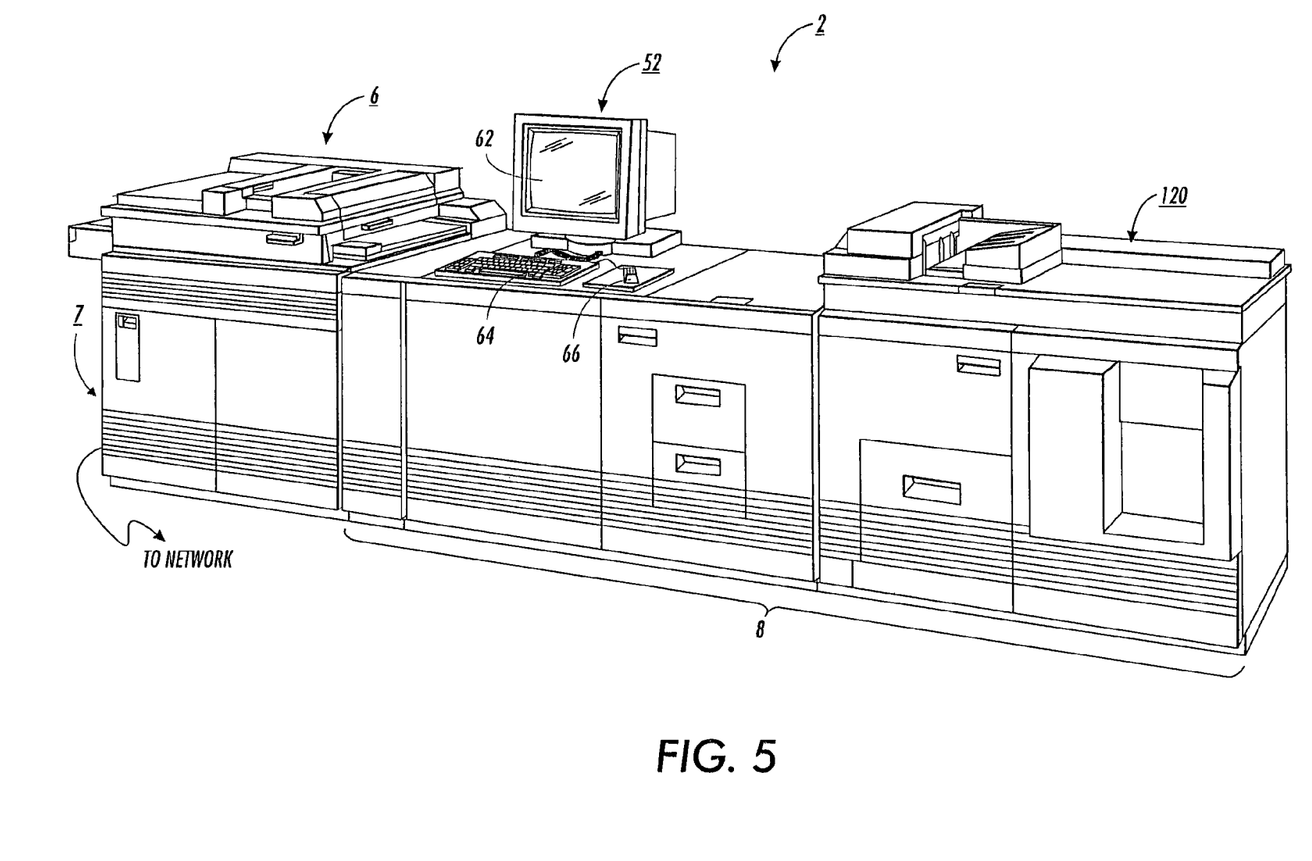
FIG. 5 is an isometric view depicting an electronic reprographic system.
Figure 6:
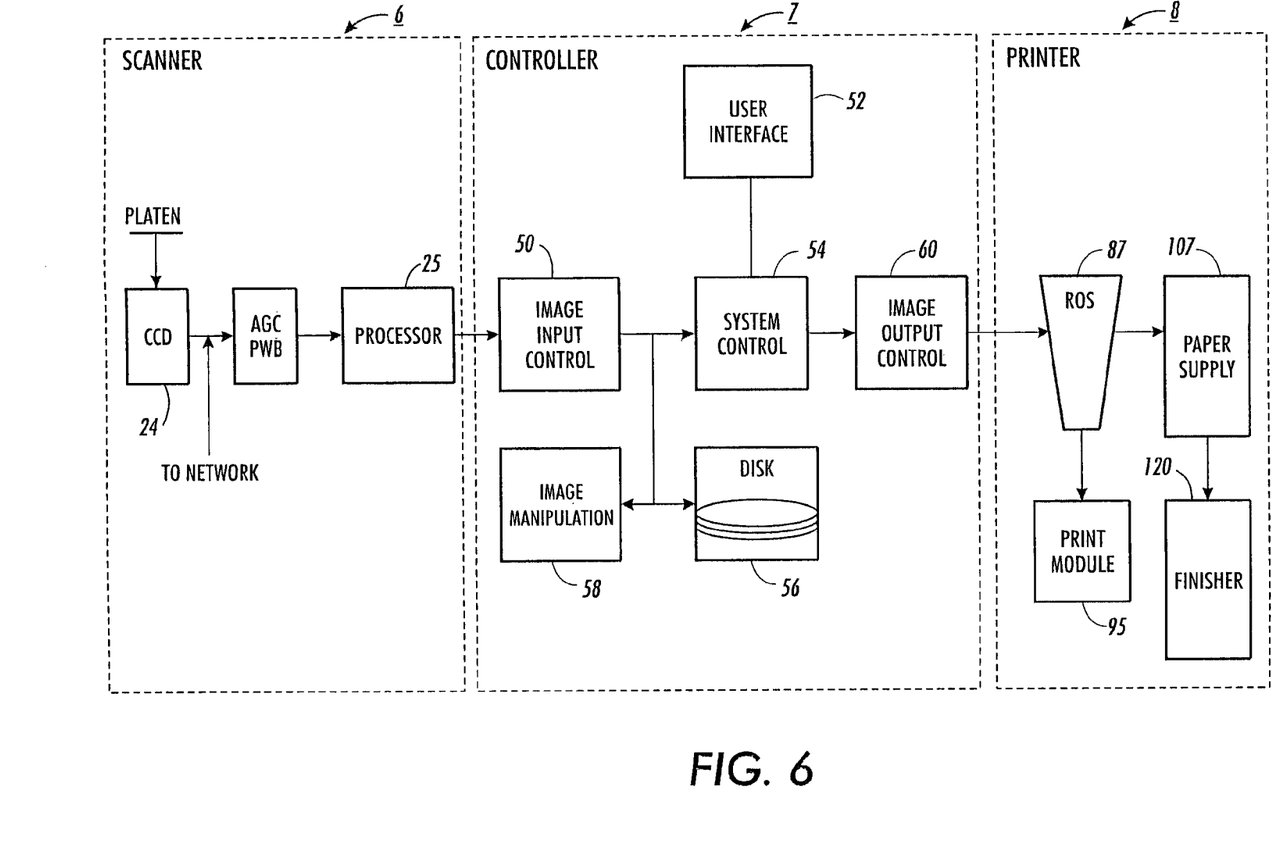
FIG. 6 is a block diagram depicting the input, output and control architectural elements of the reprographic system shown in FIG. 1.

Turning now to FIGS. 5 and 6, there is shown an exemplary electronic reprographic system 2 for processing print jobs (with corresponding job programming) in accordance with the teachings hereof. Reprographic system 2, for purposes of explanation, is divided into a scanner section 6, controller section 7, and printer section 8. While the present embodiments are described with reference to a specific reprographic system, i.e., the DocuTech Network Publishing System, the described embodiments may be used with other types of processing systems having at least some similar capabilities.

Referring to the illustrated embodiment of FIG. 6, scanner section 6 incorporates a conventional image capture platform of the type disclosed in U.S. Pat. No. 5,442,732 to Matysek et al., the disclosure of which is incorporated herein by reference. The Scanner 6 may include linear arrays (not shown) for capturing analog image signals or pixels representative of an image scanned which, after suitable processing by processor 25, are output to controller section 7. Processor 25 converts the analog image signals output by array 24 to digital image signals and processes the image signals as required to enable reprographic system 2 to store and handle the image signals or data in the form required to carry out the job programmed. Processor 25 also provides enhancements and changes to the image signals, such as filtering, thresholding, screening, cropping, and reduction/enlarging.

In the exemplary reprographic system 2 (FIG. 6), printer section 8 comprises a laser type printer and, for purposes of explanation, is separated into a Raster Output Scanner (ROS) section 87, print module section 95, paper supply section 107, and high speed finisher 120. It should be appreciated that the high speed finisher 120 could comprise one or more inline or offline finishers. Finally, in the exemplary reprographic system 2, controller section 7 is, for explanation purposes, divided into an image input controller 50, User Interface (UI) 52, system controller 54, main memory 56, image manipulation section 58, and image output controller 60.

As best seen in the illustrated embodiment of FIG. 5, UI 52 controls a combined operator controller/CRT display consisting of an interactive display screen (e.g. touchscreen) 62, keyboard 64, and mouse 66. UI 52 interfaces the operator with reprographic system 2, enabling the operator to program print jobs and other instructions (as will be discussed in further detail below) and to obtain system operating information, instructions, programming information, and diagnostic information. Items displayed on display screen 62, such as files and icons, are actuated by either touching the displayed item on display screen 62 with a finger or by using mouse 66 to point a cursor to the item selected and keying the mouse 66.

When the image data of main memory 56 requires further processing or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready, and cropping are carried out. Following processing, the data may be returned to main memory 56, sent to UI 52 for display on touchscreen 62, or sent to image output controller 60.

Figure 7:
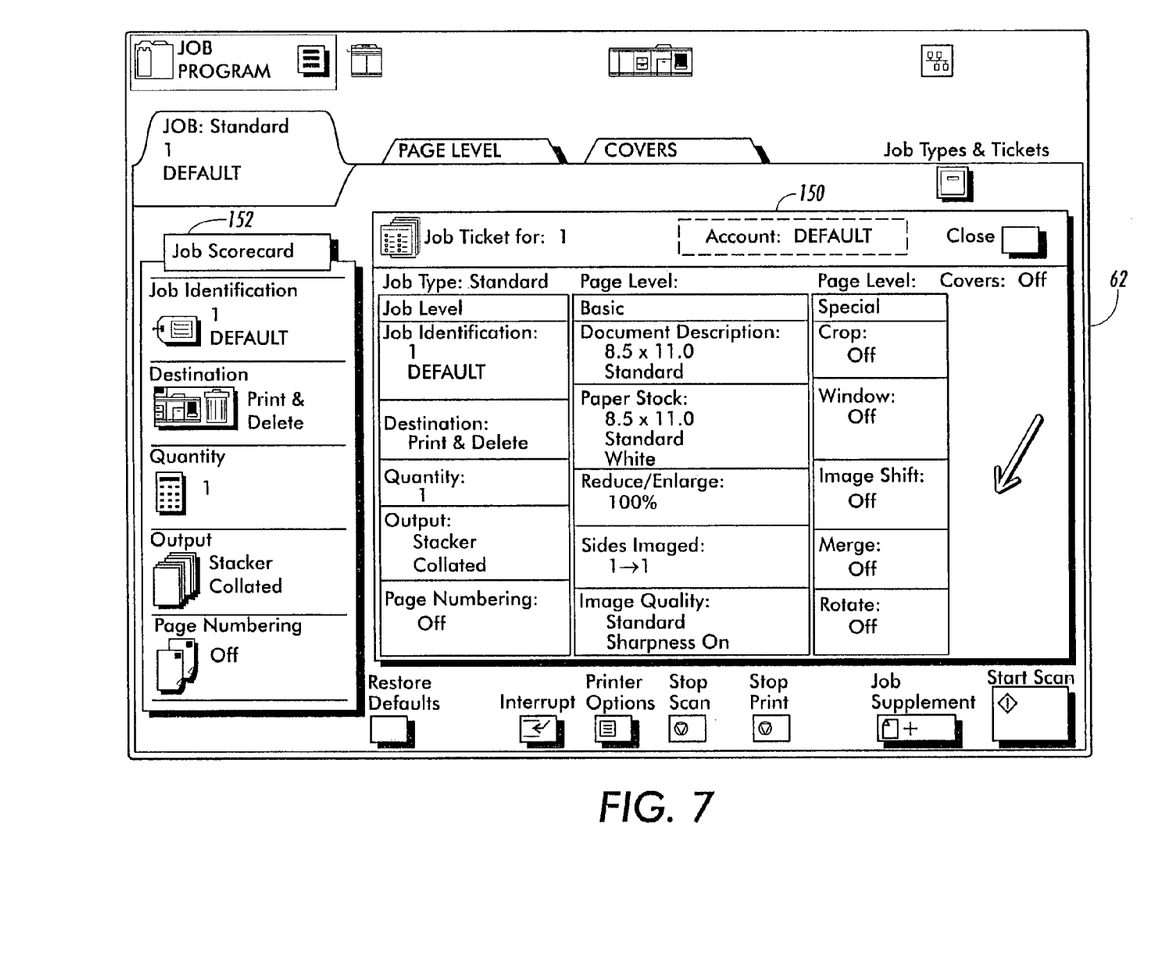
FIG. 7 is a view depicting an exemplary job programming ticket and job scorecard displayed on a User Interface (UI) of the printing system shown in FIG. 1.

Referring to the illustrated embodiment of FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. An extensive discussion of a job ticketing arrangement suitable for use on a reprographic system (of the type contemplated hereby) is provided in U.S. Pat. No. 5,079,723 to Herceg et al.

As will be appreciated by those skilled in the art, job programming can be performed at a network client when the job is to be programmed for application in a network context. Job programming techniques useful for employment in the network context are discussed in U.S. Pat. No. 5,493,634 to Bonk et al. (the disclosure of which is incorporated herein by reference) and U.S. Pat. No. 5,450,571 to Rosekrans et al.

Additional details of construction and operation of the exemplary reprographic system 2 discussed above will not be detailed herein, since such are well known in the reprographic art. Moreover, for ease of presentation, the processor 25, main memory 56 and UI 52 interconnections and software controls therebetween will not be discussed in any great detail, since such is known in the art. What will be discussed, however, is a process for linking a set of job tickets with a master or "super" ticket to greatly facilitate the job programming process mentioned above.

Figure 8:
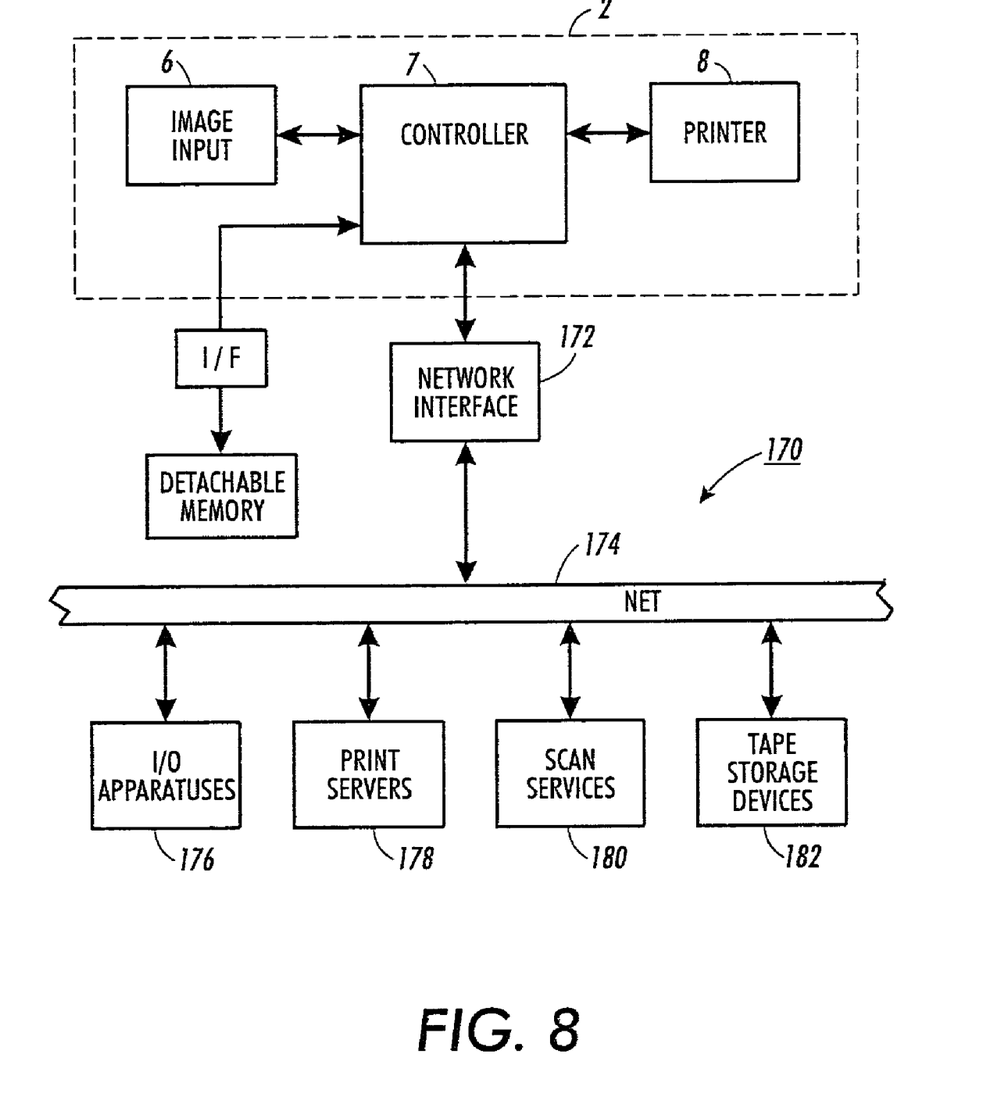
FIG. 8 is a block diagram depicting a network printing system including the printing system of FIG. 2.

Referring to FIG. 8, the controller 7 is, in one of several contemplated connective arrangements, coupled with a network arrangement 170 by way of a network interface 172. The network interface 172 includes all of the hardware and software necessary to relate the hardware/software components of the controller 7 (or, alternatively, the image input 6) with the hardware/software components of the network arrangement 170. For instance, to interface various protocols between the server and the network arrangement, the network interface could be provided with, among other software, one of Novell's "Netware" packages ("Netware" is a registered trademark of Novell Corp).

In the illustrated network arrangement 170, various I/O and storage devices are interconnected with a bus 174. In particular, the devices include, among others, the following: I/O Apparatuses 176, Print Services 178, Scan Services 180 and Tape Storage (or other suitable mass memory related) Devices 182. In the present example a given I/O Apparatus includes a client workstation, such as any suitable PC compatible apparatus.

It will be appreciated that, in practice, many network systems would be appropriate for use with the presently disclosed embodiments. Accordingly, the functionality of the disclosed embodiments below might, in some instances, be enhanced through the deployment of networks such as those disclosed U.S. Pat. No. 5,513,126 to Harkins et al. and U.S. Pat. No. 5,872,569 to Salgado et al. Moreover, the illustrated embodiment of FIG. 8 is particularly useful in a "scan-to-file" implementation of the type disclosed in U.S. Pat. No. 5,619,649 to Kovnat et al., the disclosure of which is incorporated herein.

Figure 1:
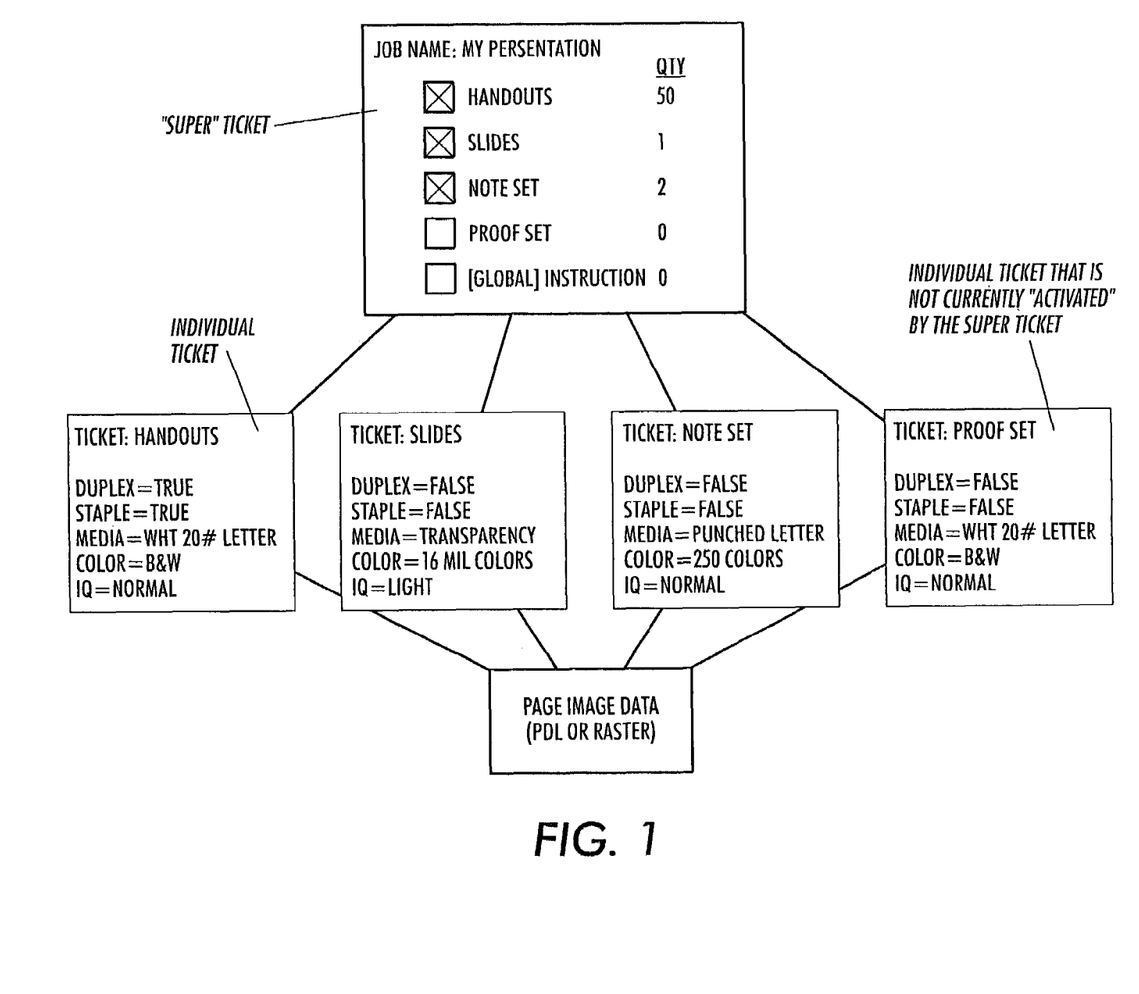
FIG. 1 is schematic, graphical representation of a job in which a master or "super" job ticket is linked with a plurality of job tickets, which plurality of job tickets are, in turn, linked with a corresponding set of image data.

A "high level" discussion of some important aspects of the disclosed embodiment(s) follows below:

The presently disclosed embodiment(s) permit multiple individual job tickets to be created for a single PDL document and activate some or all of those tickets from a "super" ticket to permit production of various physical forms of the document in one submission session. In one preferred embodiment, the system automatically creates a reference (pointer) for each individual ticket and adds the individual ticket to the super ticket. Thus the super ticket overlays individual job tickets and invokes the individual tickets by reference. Referring to FIG. 1, the relationship between the individual job tickets and the super ticket is shown in schematic, graphical form.

In practice, it would not be necessary for all individual tickets to be activated by the super ticket. It should also be recognized that the super ticket might specify certain printing parameters (shown, for exemplary purposes, as a "[global] instruction" in the super ticket of FIG. 1) that are best controlled at the highest level, thus buffering the print submission user from having to understand how to edit the more complex individual tickets.

Implementation of the concept illustrated in FIG. 1 is not technologically challenging, but would impact software design in some of the following ways:

1) Job submission clients would preferably be provided with logic and UI changes to support the programming and linking of multiple tickets for one job.

2) A few additional Job Ticket Instructions would be created for enabling the system to encode various tickets and carry corresponding super tickets referencing information. However, in all other respects, the job ticket instruction encoding approach for the disclosed embodiment(s) would employ currently accepted job ticket instruction encoding practices. For example, the job tickets could be encoded in ASCII or binary format. Moreover, the super ticket (along with its referenced individual tickets) could be embedded within given PDL file (as is currently achieved with Adobe Document Structuring Convention) or provided in a separate file with a pointer (or pointers) to the PDL file.

3) Print server's job ticket parsing logic would be provided with the capability to recognize and handle multiple tickets (through use of the corresponding super ticket), and to subsequently generate the necessary quantity of prints for each "activated" individual ticket. Internally, these could be viewed as separate jobs to the system, but to the user, they would appear as one overall job.

As will appear, the multiple print ticket scheme generally described above concept can be useful in "distribute and print" applications. For example, when a document is to be published at multiple remote sites which utilize printers from different product families, the individual print tickets could be programmed in accordance with the device dependent instructions required for each site's printer. In this example, the super ticket would control which printers are to receive the job and how many copies are to be produced at a given site. Under those circumstances in which printing is not required at one or more of sites, the super ticket could be set to "inactive" for individual tickets corresponding with such one or more sites.

Figure 2:
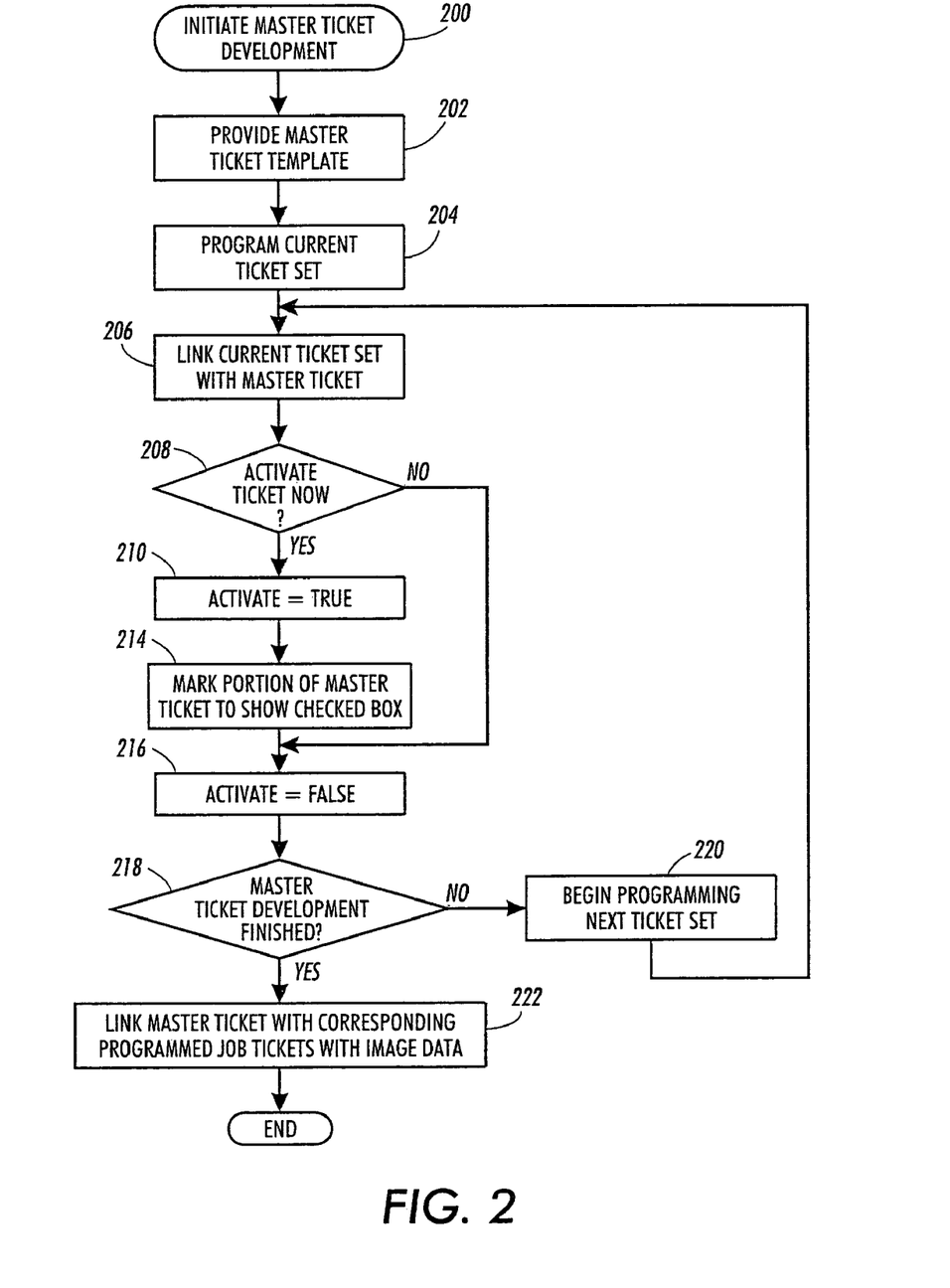
FIG. 2 is a flow diagram depicting a process for developing the job graphically represented in FIG. 1.
Figure 3:
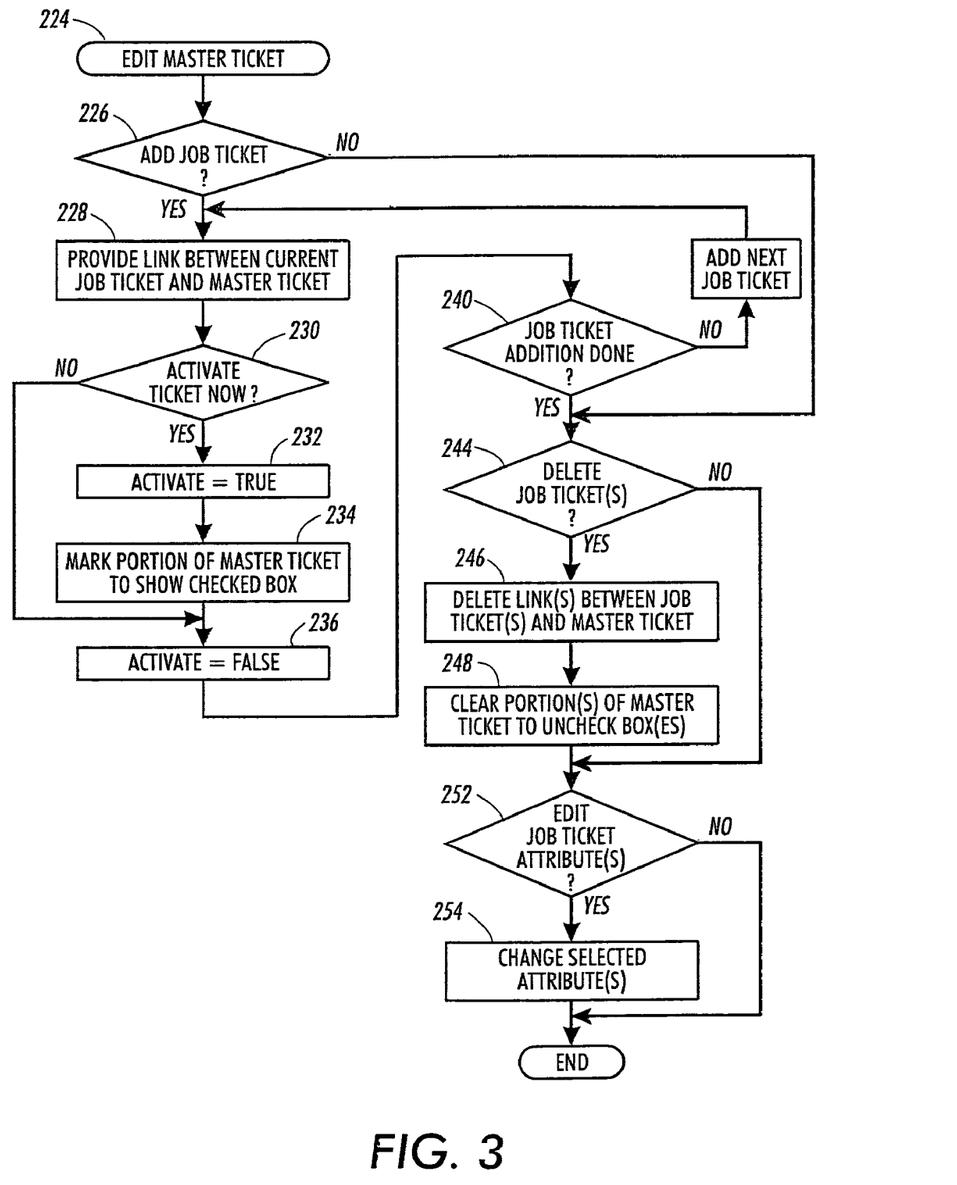
FIG. 3 is a flow diagram depicting a process for editing the master ticket of FIG. 1 and/or the job ticket(s) linked therewith.
Figure 4:
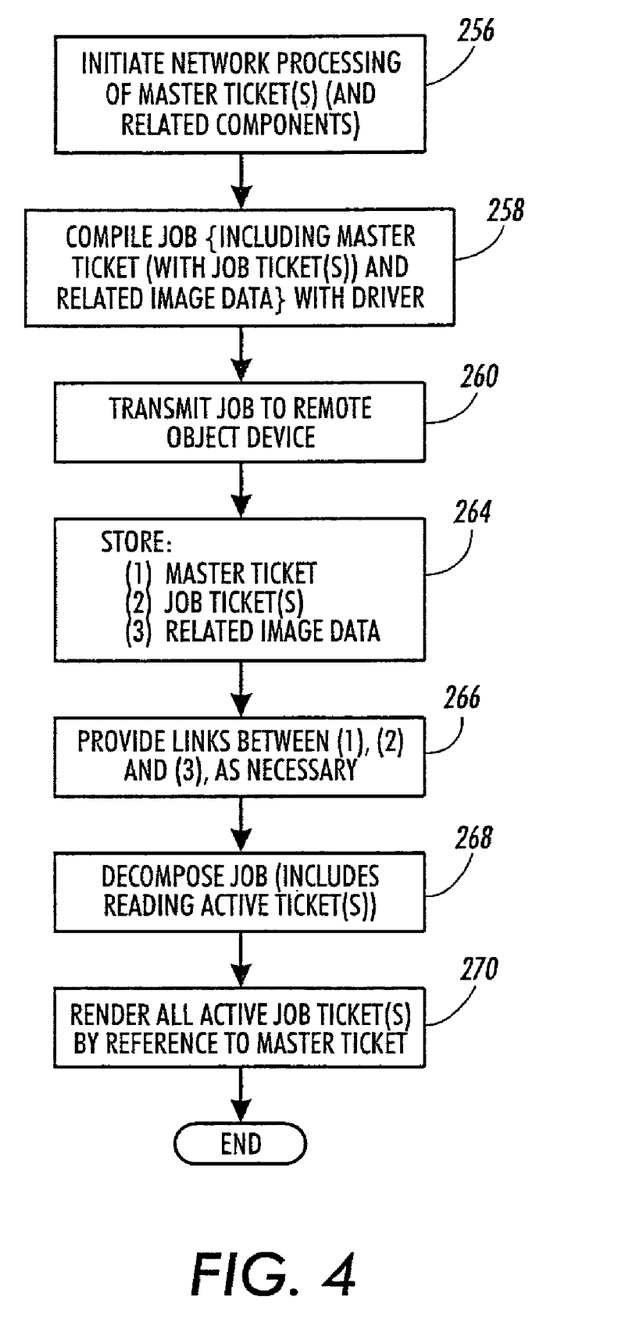
FIG. 4 is a flow diagram depicting, in part, a manner in which the job graphically represented in FIG. 1 is managed in a network context.

Referring now to FIGS. 2-4, a more detailed discussion relating to software design of the disclosed embodiment (s) is provided.

Referring first to FIG. 2, a routine for implementing super or "master" ticket development is described. When a user desires to construct a job with a super ticket, an exemplary master ticket development program is initiated at step 200. A suitable template, for use in creating the master ticket, is provided at step 202, and the user programs a current ticket set at step 204. The term "set" is used with respect to job ticket programming step because, as is known, it may require multiple tickets to adequately describe the programming for a given job. Thus multiple tickets may be associated with a given single job.

At step 206 the ticket (or tickets) for one job instance are linked to the master ticket with a suitable reference or link. By way of the query at step 208, the user is provided an opportunity to activate the current ticket set. If activation is desired, the state of the current ticket set is designated as "true" (step 210) and a portion of the master ticket template, as seen in FIG. 1, is marked (step 214) so that the master ticket includes a checked box corresponding with the current ticket set.

If activation is not desired, at least for the time-being, then the state of the current ticket set is designated as false (step 216) so that the box for the current ticket set is left unchecked. It will be appreciated that a user can always check an unchecked box later for activation.

Through steps 218 and 220, the user is provided with a mechanism by which to program as many ticket sets as needed for use with the super or master ticket. More particularly, at step 218, the user is asked whether more job tickets are to be programmed. Assuming another job ticket set is to be programmed, the illustrated routine of FIG. 2 permits the user, via step 220, to begin programming the next ticket set at step 206.

As soon as all of the necessary job ticket sets have been provided, the routine proceeds to step 222 where the master ticket (with all of the corresponding programmed job ticket sets) is linked with a set of image data. In one example, the master ticket (with individual tickets) is embedded in a PDL file.

Referring now to FIG. 3, a method for editing the master ticket (FIG. 1) and individual job tickets corresponding therewith, is discussed. When editing is desired, suitable editing software is accessed at step 224. In the illustrative editing embodiment of FIG. 3 (which only contemplates a few of numerous editing functions that can be performed with respect to the master ticket (and its attendant individual job tickets)), a user is provided with the opportunity to add/delete a job ticket or edit the attributes of an existing ticket in storage. Pursuant to adding a job ticket (step 226), a link between the ticket currently being added ("Current Job Ticket") and its corresponding master ticket is provided at step 228.

At step 230, a user may activate the current job ticket. If activation is desired, the state of the current ticket is designated as "true" (step 232) and a portion of the master ticket template, (FIGS. 1 and 2) is marked (step 234) so that the master ticket includes a checked box corresponding with the current ticket.

If activation is not desired, at least for the time-being, then the state of the current ticket set is designated as false (step 236) so that the box for the current ticket set is left unchecked. As indicated above, a user can always check an unchecked box later for activation.

At step 240, a user is provided with the opportunity to add another ticket. Assuming that another ticket is to be added, the system acknowledges that the ticket being added is a "next" or new ticket. Processing of the next ticket is then begun at step 228.

Referring to step 244, the user is provided with an opportunity for deleting one or more job tickets. Assuming deletion is desired for one of more tickets, the link(s) is deleted, via step 246, and an appropriate clearing action is performed, at step 248, by clearing the selectable portion on the master ticket corresponding with the deleted ticket. It should be appreciated that it may be undesirable to purge any given ticket from the system since a user may seek to revive the "deleted" ticket at a later time. Thus, in one preferred embodiment, a given ticket is not actually deleted, but rather severed from the master ticket and left in memory. In this way, a link between the severed ticket and the master ticket (or another master ticket) can be provided at a later time.

At step 252, a user is provided with the opportunity to edit the job attribute(s) of one or more job tickets. Any requisite changes to one or more job tickets are then made by way of step 254. Two aspects of job ticket attribute editing are noteworthy. First, the editing of a ticket in no way changes the appearance of the master ticket. In this way editing is performed in a modular fashion and any recompiling of tickets to specifically accommodate for the editing is unnecessary. Second, attribute editing can serve as a very powerful tool in "make ready" applications. For instance, a user can create "variations on a theme" for any given job. This can be very useful in producing multiple characterizations of the same job or editing a job for output at one or more different sites in one or more network systems.

Referring finally to FIG. 4, an approach for network handling of one or more master tickets with their related components is described. The network handling or processing application is initiated at step 256. It is common practice in the network-printing environment to develop a job (with appropriate programming) at a client workstation (FIG. 8). Pursuant to readying the job for transmission from the client to one or more target systems, it is conventional practice to compile the job (and programmed instructions) with a print driver. As contemplated in at least one embodiment, an image data set along with a master ticket (with linked/reference job tickets) is "packaged" by the driver (at step 258) for suitable transmission across the network.

For ease of discussion, the package (which typically will include a PDL file with image data and embedded tickets) is viewed, in the illustrated technique of FIG. 4, as being transmitted from one client to one target system. In practice, however, the package may be distributed across the network for processing at multiple sites.

It will be appreciated that submission of the package to a target system (or subsystem) need not be user driven. That is, the package can be submitted automatically, i.e., independent of the user, particularly in a network environment. For instance, a user will not necessarily be involved when the package is submitted to a target system (or subsystem) by a network server.

In one example, the package is then transmitted to a remote system or object device (step 260) for suitable storage or spooling of the (1) Master Ticket, (2) Job Ticket(s), and (3) Related Image Data. Pursuant to such storage, a data structure similar to that shown in FIG. 1 is implemented through steps 264 and 266. Pursuant to decomposing the job (step 268) all active tickets (along with the master ticket) are read. Thus during an output stage, multiple job renderings can be obtained, via step 270, by simply referencing each active job ticket designated on the master ticket.

In view of the description above, various features of the disclosed embodiment(s) can be readily recognized:

One feature facilitates multiple job renderings to be obtained through one submission. In one embodiment multiple job tickets are associated with a single image data set so that a single submission of a job to a document processing subsystem permits the single image data set to be processed several times in accordance with the multiple job control tickets.

In another embodiment the multiple job renderings can be greatly facilitated through employment of a "super" or master job ticket. That is, the user is provided the master ticket, with the master ticket having one or more user selectable portions—the one or more user selectable portions correspond respectively with one or more job control tickets. The user then selects at least one of the one or more user selectable portions and submits the single image data set with the master ticket to the document processing subsystem. In turn the single image data set is rendered in accordance with each job control ticket selected in the one or more user selectable portions.

In yet another embodiment, the master ticket is provided with a global instruction permitting a single operation to be performed across multiple job tickets associated with the master ticket.

Another feature facilitates easy and effective editing over a package of one or more job control tickets. Editing functionality may include, among other operations, adding a job control ticket, deleting a job control ticket, or changing at least one attribute associated with a job control ticket. The manner in which a job ticket can be altered without impacting the master ticket promotes modularity. Moreover, modularity is further enhanced in that attributes can be added or deleted without impacting the master control ticket. The need to recompile a package including the master control ticket and associated job control tickets is minimized.

Another feature facilitates distributed printing and make-ready operations. For example, when a document is to be published at multiple remote sites employing printers from different product families, the job control tickets of the master ticket can be programmed in accordance with the device dependent instructions required for the output device(s) of each site. Similarly, the job control tickets of the master ticket can be varied, in a make-ready context, to accommodate for the varying demands of an individual user at one or more devices.

Another feature facilitates off-line finishing situations. For example, a user can prepare a job for finishing at two off-line finishing devices by varying two of the job control tickets of the master ticket. In turn, the finishing instructions can be printed, in machine-readable terms, for future use at the off-line finishing devices.

Another feature facilitates readily adaptable job programming in a network setting. More particularly, a job structure including the master control ticket (with corresponding job control tickets) and associated image data can be easily developed at a print server for storage and future use.

Yet another feature permits an input device to be used in conjunction with a program to link first and second job control tickets with either a set of image data or a master job control ticket. In this way a single submission of a corresponding job to a document processing subsystem causes the job to be processed in the first job processing event with the first job control ticket and in the second job processing event with the second job control ticket. Accordingly, the job need not be submitted to the document processing subsystem multiple times.

Another feature facilitates the storage of an advantageous data structure for use in a multiple job rendering scheme. In one example, a data structure in which first and second job control tickets are both linked to a set of image data is stored in memory. In another example, a data structure in which the first and second job control tickets are both linked to a master job control ticket is stored in memory. In each example, the data structure is applied in such a manner that a single submission of a corresponding job to a document processing subsystem causes the job to be processed in the first job processing event with the first job control ticket and in the second job processing event with the second job control ticket. Accordingly, the job need not be submitted to the document processing subsystem multiple times.

It should be appreciated that the above-mentioned data structure is particularly useful in a network document-processing context. In one example, the data structure can be embedded in an electronic file or document for easy transmission across one or more networks. In another example, the data structure can be stored at a network server for ready access by multiple network users.

What is claimed is,

1. In a document processing system having a document processing subsystem in which a job, including a set of image data and a job control ticket, is processed each time the job, along with the job control ticket, is submitted to the document processing system, a job control system comprising:

a master job control ticket for controlling a manner in which the job is processed for multiple alternative renderings of the same set of image data in both a first job processing event and a second job processing event wherein the first and second job processing events comprise independent renderings of the image data; and an input source including a user interface with a display, the user interface being used to (a) program a first job control ticket with a first set of attributes, the first job control ticket controlling a manner in which the job is to be processed in a first job processing event, and (b) program a second job control ticket with a second set of attributes, the second job control ticket controlling a manner in which the job is to be processed in a second job processing event; and a linking program, for linking the first and second job control tickets to the master job control ticket wherein a single submission of the job comprises a submission of the set of image data with the master job control ticket and causes the job to be processed as the first and second job processing events, wherein the master job control ticket has user selectable global attributes and user selectable individual ticket attributes within the master job control ticket, the global attributes comprising properties affecting all tickets under the master job control ticket and the individual attributes comprising properties affecting only a selected ticket, and wherein the linking of the global and individual ticket attributes enables the processing of the first and second job processing events based on the same set of image data with the single submission of the job.

2. The job control system of claim 1, wherein the document processing subsystem includes first and second printers communicatively coupled with a network, and wherein a first copy of the image data is processed at the printer with the first job control ticket and a second copy of the image data is processed at the second printer with the second job control ticket.

3. The job control system of claim 1, wherein the document processing subsystem includes an image capture device.

4. The job control system of claim 3, wherein a file is generated from the image data set with said image capture device by reference to one of the first and second job control tickets, and where the file is transmitted across the network to a memory.

5. The job control system of claim 1, wherein a first set of one or more image processing operations is performed on a copy of the set of image data in the first job processing event and a second set of one or more image processing operations is performed on a copy of the set of image data in the second job processing event.

6. The job control system of claim 1, wherein a first set of make-ready operations is performed on a copy of the set of image data in the first job processing event and a second set of make-ready operations is performed on a copy of the set of images in the second job processing event.

7. The job control system of claim 1, wherein an editing operation is performed on at least one of the first and second job control tickets.

8. The job control system of claim 1, wherein the first and second job control tickets are configured so that the first set of attributes includes at least one attribute corresponding with a first type of offline finishing and/or the second set of attributes includes at least one attribute corresponding with a second type of offline finishing.

9. The job control system of claim 1, wherein, the master job control ticket includes a first user selectable portion corresponded with the first job control ticket and a second user selectable portion corresponded with the second job control ticket; and when the first user selectable portion is selected and the second user selectable portion is not, the job is processed in the first job processing event with the first job control ticket and not in the second job processing event with the second job control ticket.

10. The job control system of claim 9, wherein, the master job control ticket includes a third user selectable portion corresponded with a global instruction so that when the first second and third user selectable portions are selected, the global instruction is used to process the job in each the first job processing event and the second job processing event.

11. A document processing system having document processing subsystem in which a job, including a set of image data and a job control ticket, is processed each time the job, along with the job control ticket, is submitted to the document processing system, comprising:

a memory;

a master job control ticket for controlling the job as both a first job processing event and a second job processing event for multiple alternative renderings of the same set of image data;

a first job control ticket with a first set of attributes, the first job control ticket controlling a manner in which the job is to be processed in the first job processing event;

a second job control ticket with a second set of attributes, the second job control ticket controlling a manner in which the job is to be processed in the second job processing event; and wherein the set of image data is linked to both the first and second job control tickets so that a single submission of the set of image data with the master job control ticket causes the job to be processed in the first job processing event with the first job control ticket and in the second job processing event with the second job control ticket, and wherein the job need not be submitted multiple times to the document processing subsystem, wherein the master job control ticket has user selectable global attributes and user selectable individual ticket attributes within the master job control ticket, the global attributes comprise properties affecting all tickets under the master job control ticket and the individual attributes comprising properties affecting a selected ticket and not all of the tickets under the master job control ticket, and wherein the linking of the global and individual ticket attributes enables the processing of the first and second job processing events based on the same set of image data with the single submission of the job.

12. The document processing system of claim 11, wherein the data structure is embedded in the page description language of a file or document.

13. The document processing system of claim 11, in which the document processing subsystem communicates with said memory by way of a network, wherein the document processing subsystem is separated from said memory by the network.

14. The document processing system of claim 11, wherein the document processing subsystem includes first and second printers communicatively coupled with a network, and wherein a first copy of the image data is processed at the printer with the first job control ticket and a second copy of the image data is processed at the second printer with the second job control ticket.

15. The document processing system of claim 14, wherein one of the first and second printers comprises a xerographic printer.

16. The document processing system of claim 11, wherein the document processing subsystem includes an image capture device.

17. The document processing system of claim 16, wherein a file is generated from the image data set with said image capture device by reference to one of the first and second job control tickets, and wherein the file is transmitted across the network to said memory.

18. The document processing system of claim 11, wherein a first set of one or more image processing operations is performed on a copy of the set of image data in the first job processing event and a second set of one or more image processing operations is performed on a copy of the set of image data in the second job processing event.

19. The document processing system of claim 11, wherein a first set of make-ready operations is performed on a copy of the set of image data in the first job processing event and a second set of make-ready operations is performed on a copy of the set of images in the second job processing event.

20. The document processing system of claim 11, wherein an editing operation is performed on at least one of the first and second job control tickets.

21. The document processing system of claim 11, wherein the first and second job control tickets are configured so that the first set of attributes includes at least one attribute corresponding with a first type of offline finishing and/or the second set of attributes includes at least one attribute corresponding with a second type of offline finishing.

* * * * *